UNITED STATES PATENT OFFICE.

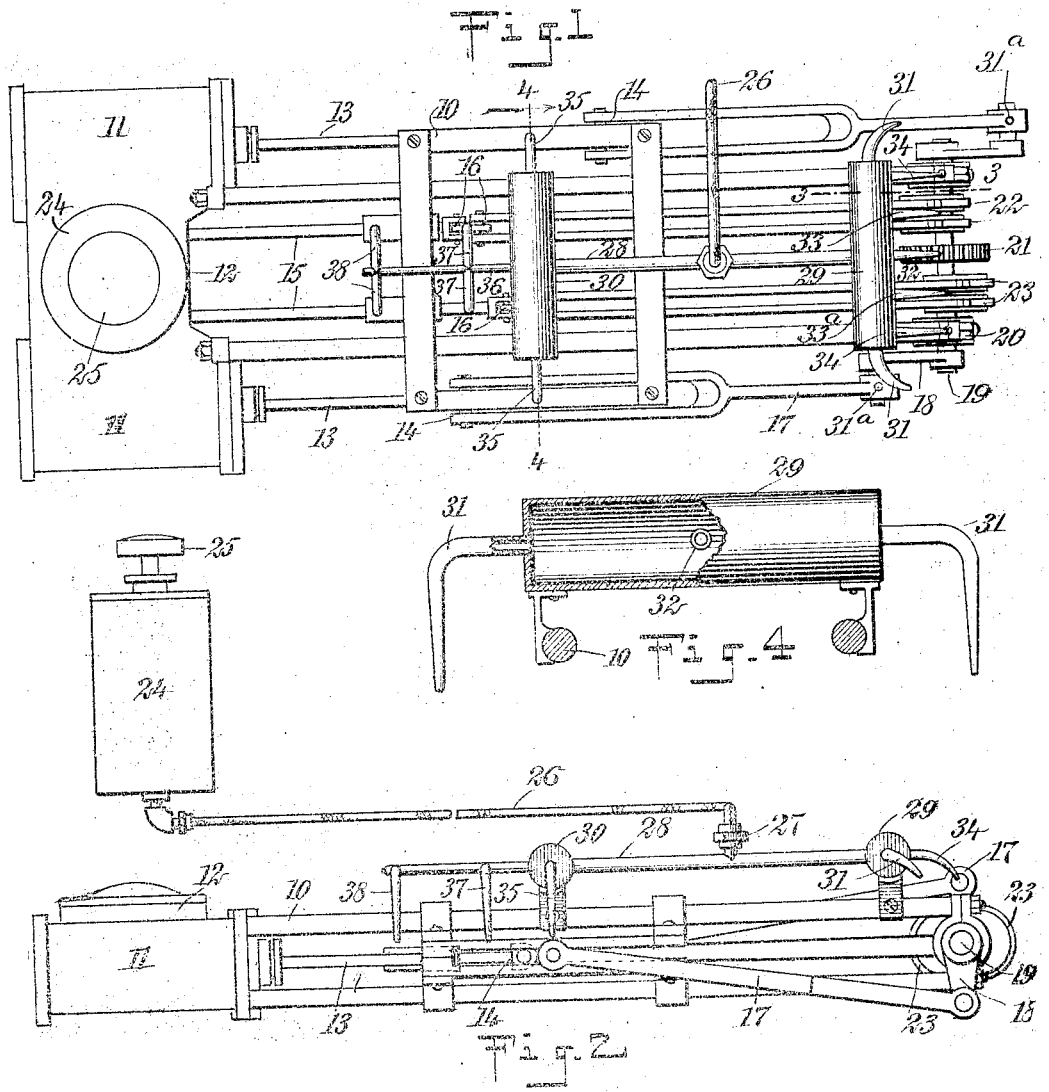

WILLIAM HIGHT, OF NEWPORT, VERMONT.

LUBRICATING SYSTEM.

No. 829,271.　　　Specification of Letters Patent.　　　Patented Aug. 21, 1906.

Application filed December 28, 1905. Serial No. 293,923.

*To all whom it may concern:*

Be it known that I, WILLIAM HIGHT, a citizen of the United States, and a resident of Newport, in the county of Orleans and State of Vermont, have invented a new and Improved Lubricating System, of which the following is a full, clear, and exact description.

My invention relates to means for lubricating the various portions of a machine, it being especially applicable to the engines of such types of automobiles as the Stanley carriage. Its principal object is to provide a system of this character in which the operator may lubricate all the frictional surfaces of the engine at the desired intervals without leaving his seat.

Reference is to be had to the accompanying drawings, forming a part of this specification, in which similar characters of reference indicate corresponding parts in all the figures.

Figure 1 is a top plan view of one embodiment of my invention applied to an engine. Fig. 2 is a side elevation thereof and including the main reservoir of the lubricating system. Fig. 3 is a longitudinal sectional detail on the line 3 3 of Fig. 1, and Fig. 4 is a partial transverse section on the line 4 4 of Fig. 1.

I have here illustrated a Stanley engine, which comprises a frame 10, upon which are mounted at one extremity cylinders 11 11, between which is a valve-chest 12. From the cylinders project piston-rods 13, supported at their outer ends by cross-heads 14, while valve-rods 15 operate in the valve-chest and are joined to links 16. Articulated to the cross-heads are pitmen 17, connected at their opposite ends with cranks 18 of a main shaft 19, journaled in bearings 20 in the frame. This shaft carries transmitting-gearing 21 and pairs of valve-operating eccentrics 22 22 and 23 23.

Mounted at some point upon the carriage where it may be conveniently reached by the operator is a main reservoir 24, which may be provided with a plunger 25, adapted to force a contained lubricant from said reservoir. The lubricant flows through a feed-pipe 26, which is preferably flexible, and a connecting-union 27 to some intermediate point in a longitudinally-extending pipe 28. The opposite extremities of this pipe 28 open into auxiliary reservoirs 29 and 30, situated adjacent to the group of frictional surfaces associated with the main shaft and the second group which is in proximity to the cylinders of the engine. From each end of the reservoir 29 opens a pipe 31, delivering above the pitman 17, so that the flow from its open end may be wiped off by the pitman at its bearing upon the crank-pin. A central pipe 32 leads to a point above the transmission-gearing, while at each side pipes 33 and 33ᵃ open between the pairs of eccentrics 22 and 23, respectively, so that they apply the lubricant to both members of each pair. Beyond the last-named pipes are similar pipes 34 34, delivering to the bearings 20. The reservoir 30 has end pipes 35 35, each of which opens over one of the cross-heads, and the travel of this member is such that the pipe also feeds to the piston-rod. From an intermediate point in the reservoir a pipe 36 extends toward the chest-valve and has oppositely-projecting branch pipes 37 37, which deliver to the links, and a second pair of branch pipes 38 38, which lubricate the guides of the valve-rods. The openings of the various delivery-pipes throughout the system are of different sizes, being designed to supply to the associated element or elements the amount of lubricant necessary to its proper operation. When the piston or pressure device in the main reservoir is depressed, the lubricant will flow through the pipe 26 into the connecting-pipe 28 and be distributed between the reservoirs 29 and 30, these furnishing an auxiliary source from which feed occurs through the delivery-pipes.

It will be evident that the engine, as is customary in the hereinbefore-mentioned carriage, may be inclosed in a casing and yet lubricated whenever desired and to the necessary extent without the opening of said casing or the operator descending from the vehicle. The lubrication may also be effected when the vehicle is in motion. As the result of the very perfect elimination of friction the engine will run much longer without adjusting and consume less fuel.

The receptacles 29 30 act as auxiliary reservoirs and provide for a continuous feed when the lubricating system is filled with oil. It is obvious that were no reservoirs provided at these points a considerably larger supply-pipe would be necessary. The provision of the reservoirs permits the storage of oil near the points where it is needed.

Having thus described my invention, I claim as new and desire to secure by Letters Patent—

A lubricator for lubricating engines of the class described comprising a main reservoir, auxiliary reservoirs arranged above the crank-shaft and cross-head, and connected with the main reservoir, each of said reservoirs being provided with relatively short outlet-pipes and the reservoir above the cross-head having a relatively long pipe extending above the valve-operating mechanism, and provided with branches.

In testimony whereof I have signed my name to this specification in the presence of two subscribing witnesses.

WILLIAM HIGHT.

Witnesses:
F. S. TINKHAM,
C. A. BROWN.